United States Patent
Keshet et al.

(10) Patent No.: US 11,509,388 B2
(45) Date of Patent: Nov. 22, 2022

(54) METHOD AND AN APPARATUS FOR USE IN A SATELLITE COMMUNICATIONS NETWORK

(71) Applicant: SATIXFY ISRAEL Ltd., Rehovot (IL)

(72) Inventors: Arie Keshet, Ramat Efal (IL); Doron Rainish, Ramat Gan (IL)

(73) Assignee: SATIXFY ISRAEL LTD., Rehovot (IL)

( * ) Notice: Subject to any disclaimer, the term of this patent is extended or adjusted under 35 U.S.C. 154(b) by 0 days.

(21) Appl. No.: 16/969,073

(22) PCT Filed: Feb. 12, 2019

(86) PCT No.: PCT/IL2019/050167
§ 371 (c)(1),
(2) Date: Aug. 11, 2020

(87) PCT Pub. No.: WO2019/159164
PCT Pub. Date: Aug. 22, 2019

(65) Prior Publication Data
US 2021/0036766 A1    Feb. 4, 2021

Related U.S. Application Data

(60) Provisional application No. 62/629,723, filed on Feb. 13, 2018, provisional application No. 62/731,110, filed on Sep. 14, 2018.

(51) Int. Cl.
*H04B 7/185*   (2006.01)
*H04W 24/10*   (2009.01)
*H04W 88/16*   (2009.01)

(52) U.S. Cl.
CPC ........ *H04B 7/18513* (2013.01); *H04W 24/10* (2013.01); *H04W 88/16* (2013.01)

(58) Field of Classification Search
CPC ............ H04B 7/18513; H04B 7/18543; H04B 7/2041; H04B 7/1851; H04B 7/10;
(Continued)

(56) References Cited

U.S. PATENT DOCUMENTS

| | | |
|---|---|---|
| 5,668,556 A | 9/1997 | Rouffet et al. |
| 2002/0009052 A1 | 1/2002 | Baudoin et al. |

(Continued)

FOREIGN PATENT DOCUMENTS

| | | |
|---|---|---|
| EP | 3120467 B1 | 2/2019 |
| WO | 2008060760 A2 | 5/2008 |

(Continued)

OTHER PUBLICATIONS

Kogler E. et al. "Timing Synchronization in MF-TDMA Systems for Geostationary Satellites" IEEE communications magazine 45 12 pp. 36-42 (Dec. 2007).

*Primary Examiner* — Fred A Casca
(74) *Attorney, Agent, or Firm* — Browdy and Neimark, PLLC (57) ABSTRACT

A method is provided for off-loading MAC (medium access control) functionalities that were previously carried out by satellites, and carry out these functionalities by control gateways that are located on the ground, and by implementing that to simplify the operation and maintenance of the satellite communications network.

17 Claims, 7 Drawing Sheets

(58) Field of Classification Search
CPC ............ H04B 7/18508; H04B 7/18523; H04B 7/18578; H04W 24/10; H04W 88/16; H04W 16/28; H04W 84/06; H04N 7/20; H01Q 3/2605; H01Q 5/50; H01Q 25/00
See application file for complete search history.

(56) References Cited

U.S. PATENT DOCUMENTS

| | | |
|---|---|---|
| 2008/0274690 A1 | 11/2008 | Laufer |
| 2010/0017826 A1* | 1/2010 | Fitting ............... H04N 21/6193 725/65 |
| 2011/0268017 A1 | 11/2011 | Miller |
| 2017/0005741 A1 | 1/2017 | Wu et al. |
| 2017/0085411 A1 | 3/2017 | Noerpel et al. |
| 2017/0104521 A1* | 4/2017 | Le Pera ............. H04B 7/18523 |
| 2018/0006714 A1 | 1/2018 | Hreha et al. |
| 2019/0199428 A1* | 6/2019 | Regunathan ....... H04B 7/18513 |

FOREIGN PATENT DOCUMENTS

| | | |
|---|---|---|
| WO | 2009/021238 A1 | 2/2009 |
| WO | 2016/205765 A1 | 12/2016 |

* cited by examiner

METHOD AND AN APPARATUS FOR USE IN A SATELLITE COMMUNICATIONS NETWORK

FIELD OF THE DISCLOSURE

The present disclosure relates to the field of communications and in particularly to communications exchanged in a satellite communications network.

BACKGROUND OF THE DISCLSOURE

Communication satellites in Low Earth Orbit (LEO), circle the earth at a relatively low altitude from 500 to 1500 km. At these altitudes, the orbital period is in the order of 90 to 120 minutes and a satellite is only visible from any location on the ground for just a small period of the time. Furthermore, because the satellite circles the earth at a relatively low altitude, its field of view is limited to a few thousand km at the most. For both these reasons, several LEO satellites—a constellation—are used in order to provide continuous communication coverage over a large area. In a typical constellation, several LEO satellites (e.g. 10) are placed at the same orbit at equal distances from each other. Additionally, similar groups of satellites (e.g. 12 in all) are placed each at a separate orbit, with the orbits being displaced from each other to provide optimal overall coverage. The constellation as a whole—120 satellites in this example—can provide continuous coverage of a large part of the globe by ensuring that at least one satellite is always visible from every location within the coverage area.

To increase their communications capacity and improve signal strength ("link budget"), LEO satellites typically use either multiple antennas or a multi-beam antenna array to illuminate their coverage area by multiple adjoining beams, each serving a ground cell. The RF bandwidth that is available to the satellite is re-used among beams in essentially the same way as in cellular networks.

To optimize bandwidth and transmission power, the ground terminals that communicate with the satellite constellation are divided into two main categories:

a) User terminals, which serve end-users such as remote homes or small businesses. These user terminals are typically small, large in number and are spread across the satellite's coverage area.

b) Gateways, on the other hand, are large earth stations that connect the system to terrestrial networks and eventually to the Internet. They have large capacity and are few in number.

Separate sets of beams are used to connect each satellite to user terminals and gateways. Specifically, there is a small number (e.g. 3) of narrow gateway beams, each configured to illuminate one gateway.

A centralized ground network operations center (NOC) is usually established to control and manage the satellite constellation and gateways. A private terrestrial network connects the NOC to the gateways and—through them—to the satellites.

LEO communication satellites are designed to act as either a relay or a switch. A relaying satellite (a.k.a. a "bent-pipe" satellite) receives signals from ground terminals and transmits them—after filtering, frequency-conversion and amplification—at the same format back to the ground. A switching satellite (a.k.a. regenerative or on-board-processing satellite), on the other hand, relies on a pre-agreed, packetized and addressed format of the ground signal to first demodulate it and then route each packet, based on its forwarding address, to one of its transmit beams, where it is modulated onto an appropriate channel for transmission towards the ground.

A relaying satellite provides fixed, pre-configured connections between user beams and gateway beams. A switching satellite provides any-to-any connectivity, with each individual packet conveyed along a path based on its forwarding address.

Switching satellites are usually equipped with inter-satellite links (ISLs)—being direct radio frequency (RF) or optical links extending between adjacent satellites in the constellation. The ISLs form part of the system's switching fabric so that a properly addressed packet can be received from the ground and routed through multiple satellites before finally transmitted back to the ground anywhere within the constellation's coverage area.

In a switching satellite, each individual user beam operates as a star—or hub-and-spokes—network, with the satellite acting as the network's hub. In such a network, the channel extending from the satellite (hub) to the user terminals (spokes) is called a forward channel, while the channel from the user terminals to the hub is referred to as a return channel. The user-beam network can use the DVB-RCS2 standard for the air interface, enhanced to support LEO-system-specific requirements such as satellite tracking and handover. Gateway beams, on the other hand, are essentially one-to-one duplex connections: DVB-S2X is a common choice for implementing each half of this link.

Multi-beam satellites re-use the available spectrum among user beams in the same way as cellular networks do. In a frequency division (FD) scheme, the spectrum is divided into N (typically four) parts, each of which is used in a sub-set of beams according to an N-color map pattern. Alternatively, with time division (TD) or beam hopping, the entire spectrum is used over one in N cells at a time, changing the illuminated cells in an N-dwell cyclic pattern that is the analog of the N-color map. One of the advantages of beam hopping is the smaller number of receive and transmit chains it uses, leading to cost savings even when taking into consideration the larger bandwidth and higher power that a TD chain requires to keep overall capacity equal to that of an FD system. This advantage becomes even more significant for beams covering low-demand areas: there, the hopping cycle can be extended to more than N dwells, sharing capacity over a larger number of cells, while possibly allocating different dwell time to each cell, with none of the additional costs that FD would entail in such a scenario.

Beam-forming antenna arrays can be used to cost-effectively create a large number of narrow user beams, thus improving power efficiency and making it possible to use lower-size and therefore lower-cost user terminals. At the same time, the number of concurrent receive and transmit signals is still limited by power and other implementation constraints. Beam hopping can be used to bridge this gap: signals are switched—or hopped—among several antenna beams, in a pattern that matches capacity with traffic demand in the cell covered by each beam dwell.

As explained above, in a switching satellite each individual user beam operates as a star—or hub-and-spokes—network, with the satellite acting as the network's hub: this is called the access network part of the system. The access network typically uses an air interface that complies with the DVB-RCS2 standard. Accordingly, part of the satellite payload acts as the DVB-RCS2 network's hub/NCC, or in short hub.

It is generally desirable to reduce the complexity of the satellite to a minimum by moving as much functionality as possible to the ground stations. Yet, in the case that a DVB-RCS2 hub is used, some functions must be implemented on board the satellite. Among those are packet assembly/disassembly; data and control multiplexing/demultiplexing; modulation/demodulation and synchronization. Other functions, mainly related to DVB-RCS2 medium access control (MAC), can be performed on the ground, in a functional block called "ground MAC controller". For this purpose, a logical point-to-point control link is defined between the reduced-functionality hub (on-board the satellite) and the ground MAC controller. The MAC controller is usually co-located with a gateway, and the control link is carried over the gateway beam (and possibly ISLs when a direct connection is unavailable).

The control link carries:
in the downlink direction (serving the DVB-RCS2 return channel):
Return channel control frames ("L2S"—layer-2 signaling), including Logon frames; and
Reception metrics for return-channel bursts: frequency, timing, signal-to-noise
in the uplink direction (serving the DVB-RCS2 forward channel):
Forward channel tables (L2S);
Return channel MF-TDMA structure information (for use by the on-board return channel receivers)
Forward channel ACM settings; and
Control messages for handover, return-channel receiver configuration etc.

The MAC controller may be implemented as part of the NOC, controlling from a central location all the access networks (user beams) associated with the system. However, this configuration has several drawbacks:

Any anomaly such as NOC unavailability or network congestion, impacts the entire network;

The round-trip propagation time over the terrestrial network to the NOC increases the duration of MAC exchanges, slowing down the response time to capacity allocation requests, transmit power changes, etc.

The present invention seeks to provide a different solution to the above constraints.

SUMMARY OF THE DISCLOSURE

Therefore, it is an object of the present disclosure to provide a novel method and device for carrying out communications in a satellite network.

It is another object of the present disclosure to provide a novel method that enables off-loading MAC functionalities that were previously carried out by satellites, and carry out these functionalities by control gateways that are located on the ground, and by implementing that to simplify the operation and maintenance of the satellite communications network.

It is another object of the present disclosure to provide a novel method that enables separation between satellite and a control gateway in a way that the user terminals are unaware of that separation. For example, the user terminals are configured to operate on a per DVB-RCS2 basis, without being aware of the separation.

Other objects of the present invention will become more apparent from the following detailed description of the invention taken together with the accompanying examples and appended claims.

Thus, according to an embodiment of the present invention there is provided a method for handling communications exchanged in a satellite communication network, wherein the method is characterized in that a plurality of user terminals located within a single cell (i.e. an area which is covered by a beam or hopping-beam dwell) are configured to communicate with a satellite operative in said satellite communication network, while MAC functionalities required for the plurality of user terminals to operate, are carried out by a communication device operative as a control gateway ("CoG"). Optionally, the CoG is configured to execute essentially all MAC functions that involve the plurality of user terminals (i.e. the user terminals located within that single cell).

By yet another embodiment, the method provided further comprises a step of configuring a satellite operative in the satellite communication network to enable carrying out MAC functionalities associated with the plurality of user terminals by said CoG, and wherein said plurality of user terminals are unaware that said MAC functionalities are carried out by said CoG rather than by the satellite.

In accordance with another embodiment, part of the MAC functions required for the operation of the plurality of user terminals, are handled by a satellite that belongs to the satellite communication network, whereas other MAC functions are handled by at least one communication device located on the ground and operating as a CoG.

According to still another embodiment, the method provided further comprises a step of affecting separation between MAC functionalities performed by a satellite operative in said satellite communication network and MAC functionalities performed by the control gateway, in a way that the plurality of user terminals are unaware of that separation. For example, the user terminals may be configured to operate via a DVB-RCS2 interface, without being aware which is the entity that is carrying out one functionality or another.

According to an embodiment of the present disclosure, the MAC functions which the CoG is configured to execute, include enabling a real-time handover between satellites.

According to another embodiment, the plurality of user terminals located within that single cell are associated with (e.g. assigned to, linked to) the CoG on a permanent basis.

In accordance with another embodiment, the CoG is further configured to carry out non-real time operations (e.g. at times when network is not too loaded). For example, carrying out implementation of a handover set-up.

According to another embodiment, the CoG role is limited to the control plane. According to this embodiment, the CoG has no role in user's data processing nor in directly conveying user's traffic flows between the satellite and a destination gateway or designated user terminal.

By still another embodiment the method comprises the following steps associated with the return channel direction, wherein:
(i) separating control frames (preferably including Logon frames) from data frames;
(ii) extracting DVB-RCS2 control fields from data frames' content;
(iii) processing data frames' content and forwarding them directly towards their respective destinations; and
(iv) forwarding control frames and data frames' control fields to the CoG.

In the forward channel direction, the CoG forwards control information to the satellite, which is intended for the user terminals. Preferably, the satellite receives data traffic from one or more sources and multiplexes it together with the control information, for transmission of the multiplexed result to the user terminals.

By yet another embodiment, a single CoG is used for all access networks (i.e. cells) served by a satellite at a given time.

According to still another embodiment, the CoG is directly linked to a satellite (without using ISLs) in order to reduce MAC response time.

In accordance with another embodiment, the method provided comprises a step of sending information from the CoG to the satellite, to allow Adaptive Coding and Modulation ("ACM") of a forward channel, and storing that information at an on-board memory means comprised within the satellite.

By still another embodiment, the method comprises:
(i) receiving signal-to-noise measurement reports from each of the plurality of user terminals located within a cell, wherein these reports relate to signal-to-noise ratio associated with communications conveyed along a forward channel and received by a respective user terminal providing its signal-to-noise measurement report;
(ii) based on the signal-to-noise measurement report received from each of the plurality of user terminals, assign a MODCOD (preferably one which corresponds to the highest level currently possible) to each of the user terminals; and
(iii) transmit to the satellite an updated terminal-address-MODCOD couplet.

According to still another embodiment, the method further comprising:
(i) populating (by a satellite included in the satellite network), based on the MODCOD couplets received from the CoG, a MODCOD look-up table indexed by the user terminal's address; and
(ii) upon receiving a forward-channel packet for transmission to a user terminal, applying a user-terminal address associated with that forward-channel packet, for retrieving a MODCOD comprised in the look-up table and use the retrieved MODCOD for transmitting the forward-channel packet to the appropriate user terminal.

By still another embodiment, a separate MODCOD look-up table is maintained at the satellite for each cell (e.g. beam or hopping beam dwell) that the satellite is configured to communicate with user terminals located thereat.

According to another aspect of the disclosure there is provided a control gateway ("CoG") adapted to be used in a satellite communication network, wherein said CoG is configured to execute MAC functions required to enable operation of a plurality of user terminals located within a single cell.

In accordance with another embodiment, the MAC functions which the CoG is configured to execute, include enabling a real-time handover between satellites.

According to still another embodiment of this aspect of the disclosure the plurality of user terminals located within said single cell are associated (e.g. linked) with the CoG on a permanent basis. By yet another embodiment, the CoG is further configured to carry out non-real time operations.

According to still another embodiment, the control gateway is configured to provide services to a plurality of cells, each having its own plurality of user terminals, and wherein all cells that belong to the plurality of cells, are simultaneously served by a satellite at a given time.

In accordance with another embodiment, the control gateway is further configured to send to a satellite connected thereto (preferably by using a control link) information that allows the satellite to apply a respective Adaptive Coding and Modulation ("ACM") scheme to a forward channel.

According to yet another embodiment, the CoG comprises at least one processor operative to:
(1) receive signal-to-noise measurement reports from each of the plurality of the user terminals located within a cell controlled by the CoG, wherein the reports relate to signal-to-noise ratio associated with communications conveyed along a forward channel and received by a respective user terminal providing a signal-to-noise measurement report;
(2) based on the signal-to-noise measurement report received from each of the plurality of user terminals, assign a MODCOD to each of the user terminals; and
(3) transmit to the satellite an updated terminal-address-MODCOD couplet.

BRIEF DESCRIPTION OF THE DRAWINGS

The present invention will be more fully understood from the following detailed description of the embodiments thereof, taken together with the drawings in which:

FIG. 4A demonstrates a logon procedure as implemented in prior art, whereas FIGS. 4B to 4D demonstrate logon procedures in accordance with embodiments construed according to the present invention.

DETAILED DESCRIPTION OF THE DISCLOSURE

In the following description, for the purposes of explanation, numerous specific details are set forth in order to provide a better understanding of the present invention by way of examples. It should be apparent, however, that the present invention may be practiced without these specific details.

The solution provided by the present disclosure offers a method for handling communications being exchanged in a satellite network. The solution is based on having a plurality of user terminals which are located within a single cell (i.e. an area which is covered by a beam or hopping-beam dwell) associated with a control gateway ("CoG"). The CoG is configured to act as the MAC controller for the cell's terminals and is configured to execute MAC functions (preferably essentially all MAC functions) that are associated with the plurality of the user terminals located within that single cell. Preferably, a control link is established between the CoG and the satellite acting as hub for the cell. As previously explained, the control link carries information (preferably all information) needed for communications to be exchanged between the hub and MAC controller, such as signaling, reception metrics etc.

In other words, the present invention enables off-loading at least the major portion of the MAC part of the DVB-RCS2 hub from the satellite to a ground station (with the control link being a major element in this implementation), and the MAC controller is distributed in CoGs rather than acting as a centralized entity in a NOC.

Figure 1:
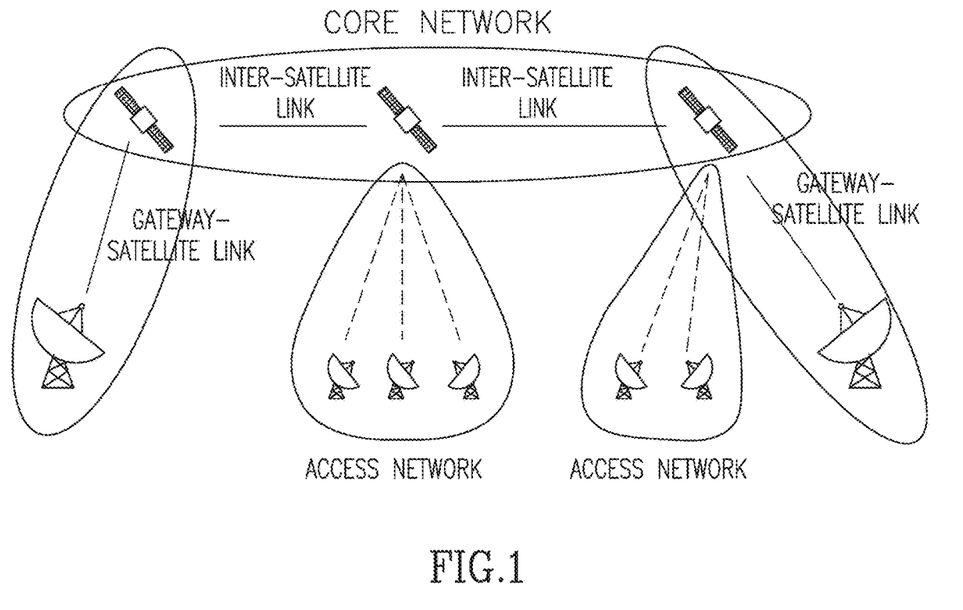
FIG. 1—illustrates a schematic view of a satellite communication network that includes a core network and a plurality of access networks (e.g. cells)

FIG. 1 illustrates a schematic view of a satellite communications network that includes a core network and a plurality of access networks (e.g. cells). As depicted in the example of FIG. 1, the network comprises three satellites that are connected by inter-satellite links, where a satellite is configured to communicate with a control gateway (via a link extending between the satellite and the CoG), with an access network that comprises a plurality of user terminals, or with both a control gateway and a plurality of user terminals. As explained above, when implementing the proposed solution whereby the satellite communicates with a control gateway, a major part or even essentially all the NAC functionalities required for user terminals located in a cell to operate are handled by the control gateway rather than by the satellite, which in turn reduces the load in the satellite, thereby simplifying both the operation and the maintenance of the satellite communications network.

Figure 2:
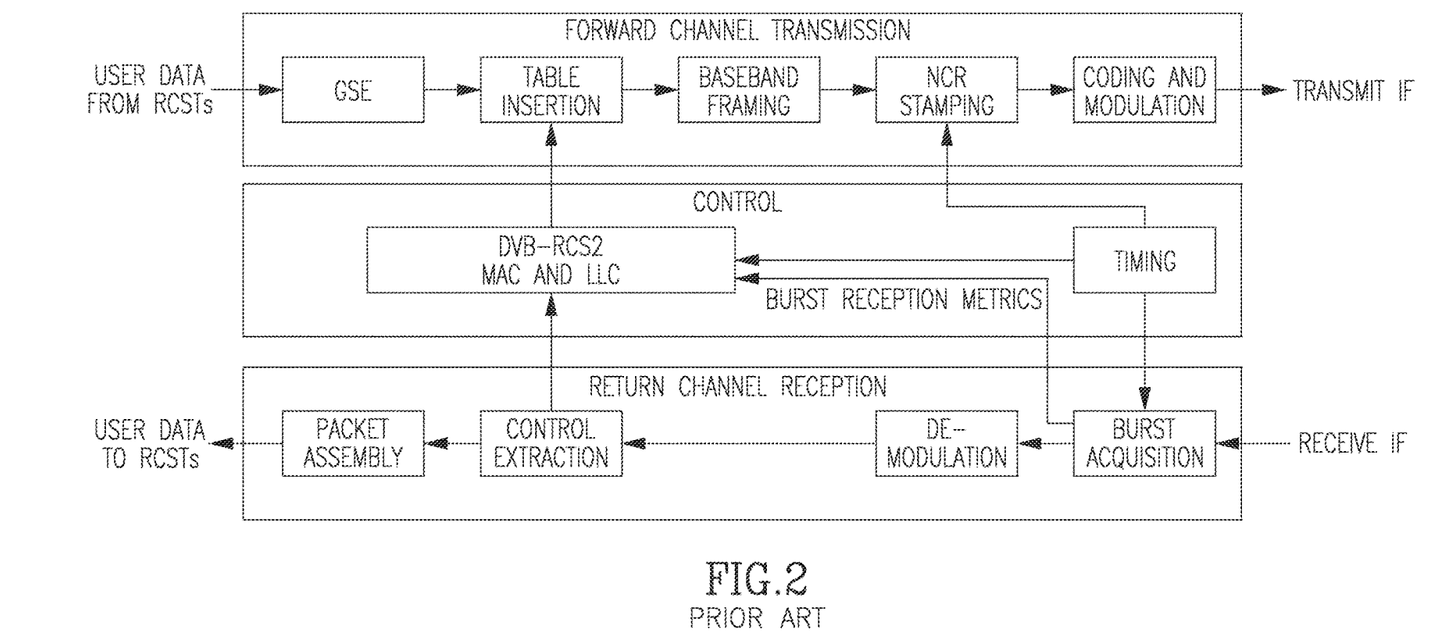
FIG. 2—illustrates a block diagram of a prior art DVB-RCS "NCC" (hub) as used for a case of a relaying (bent-pipe) satellite.

FIG. 2 demonstrates a block diagram of a prior art DVB-RCS "NCC" (hub) as used for a case of a relaying (bent-pipe) satellite, without implementing the control gateway of the present invention.

Figure 3:
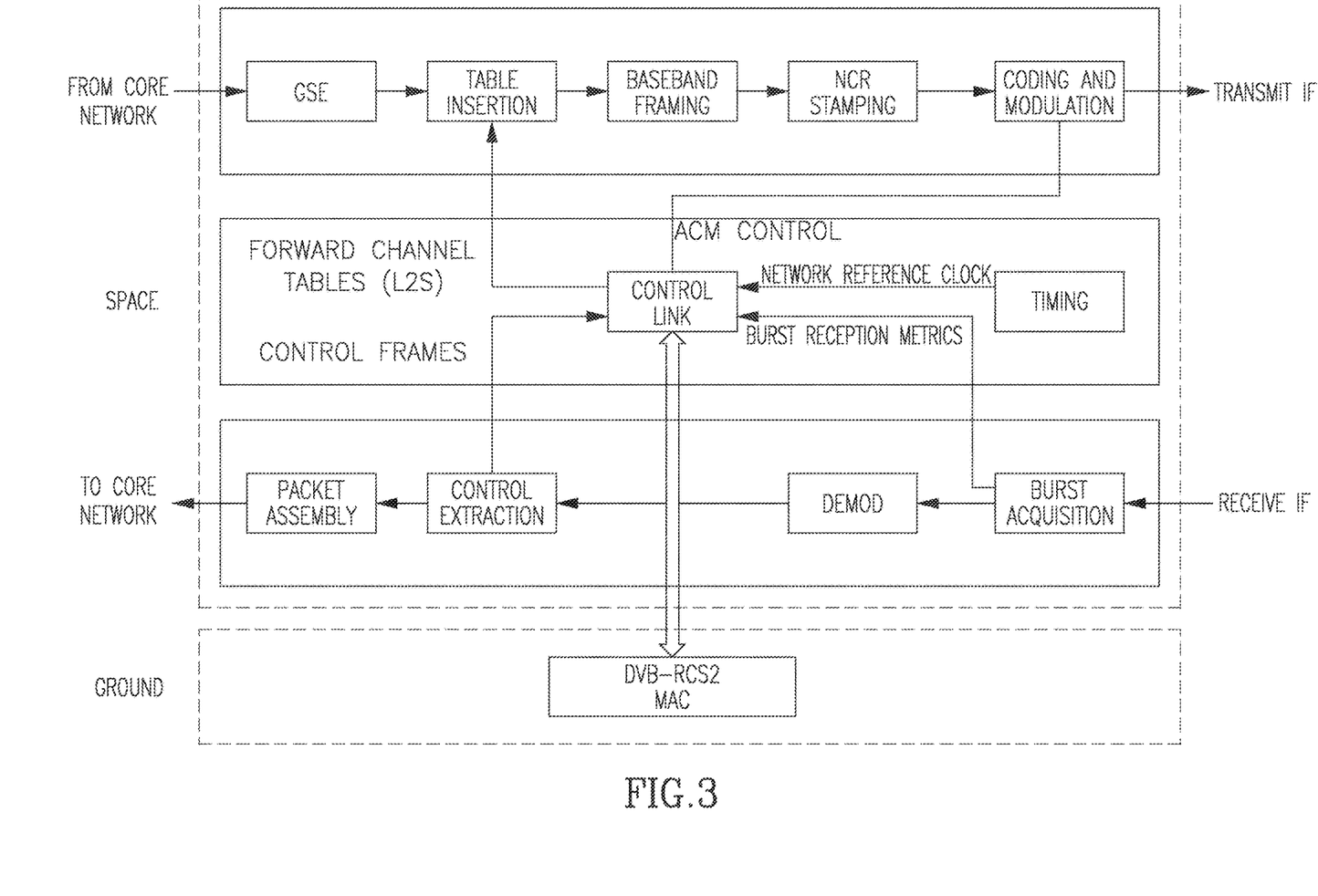
FIG. 3—illustrates a block diagram of a reduced functionality satellite connected by a control link to a ground MAC controller.

FIG. 3—presents a block diagram of a satellite connected by a control link to a ground MAC controller (the CoG), which illustrates a reduced functionality that is required to be carried out by the satellite (in space) due to off-loading MAC functionalities from the satellite to the DVB-RCS2 MAC controller located on the ground.

A preferred embodiment for implementing the solution proposed by the present invention involves using Adaptive Coding and Modulation technique.

Adaptive Coding and Modulation is a technology which can automatically change the modulation and forward error correction or FEC of a link (referred to herein as modulation/coding "MODCOD") to compensate for changes in link conditions—commonly weather induced (e.g. rain fade) but also due to changes in the RF environment (e.g. level changes, interference).

The use of ACM makes it unnecessary for service operators and system designers to trade off desired link availability and throughput. When compared with links designed using fixed coding, ACM can increase the throughput of a robust link by allowing it to dynamically adjust to a less robust MODCOD resulting in higher throughput under clear sky conditions. Conversely, when compared to a modestly robust fixed rate coded link, ACM can provide increased link availability by dynamically adjusting to lower order MODCOD under rain fade conditions. DVB-RCS2 specifies procedures for ACM of the forward channel as well as return channel.

Optionally, the method provided further comprises sending over the control link extending between the CoG and the satellite information which relates to ACM of the DVB-RCS2 forward channel and storing the information at an on-board memory means comprised within the satellite.

The CoG may comprise at least one processor which is operative to:
  (i) receive reports from each of the user terminals located within the cell controlled by the CoG on the signal-to-noise of the forward channel, as received by that user terminal;
  (ii) assign a MODCOD (preferably the highest possible level) to each user terminal; and
  (iii) transmit to the satellite an updated terminal-address-MODCOD couplets.

The satellite may comprise at least one processor which is configured to:
  (a) populate, with the updated couplets received from the CoG, a MODCOD look-up table indexed by the user terminal address, where a separate table may be maintained at the satellite for each cell (beam or hopping beam dwell); and
  (b) upon receiving a forward-channel packet for transmission over the forward channel to a certain user terminal, retrieve the user-terminal address comprised in the forward-channel packet of that certain user terminal, retrieve the MODCOD that is associated with the MODCOD assigned to that certain user terminal from the MODCOD look-up table, and use the MODCOD retrieved for transmitting the forward-channel packet to the user terminal.

Following is a description of logon procedures that may be implemented as part of the solution provided by the present invention.

In order to discuss this aspect of the present invention, the following information will be used.

First, the logging user terminal is aware of the direction to the closest satellite (within a beam width accuracy) by the ephemeris and accurate enough timing.

The logging user terminal is aware that it will receive a super frame at least once per each repetition time.

Once synchronized, the user terminal is configured to read the DVB-SI and NCR related information and to transmit CSC on RTN hops until it receives its own TIM-U with SYNC channel allocation.

The counting of "time outs" is configured to ignore any "dead gaps" that exist between two consecutive hops. Next, the user terminal will transmit SYNC on RTN hops and will receive CMT on FWD hops.

This whole process is managed by the respective gateway, and the time outs associated with the process takes into account the round-trip delay to the that gateway.

The following terms/abbreviations are used in FIGS. 4A to 4D for describing the procedures depicted in these figures:
CMT—Correction Message Table;
CR—Capacity Request;
CSC—Common Signaling Channel;
NCR—Network Clock reference;
PCR—Program Clock Reference;
SF—Super Frame;
SI—Service Information;
SYNC—Synchronization burst type;
TIM—Terminal Information Message;
TIM-U—TIM Unicast; and
TRF—Traffic.

Figure 4A:
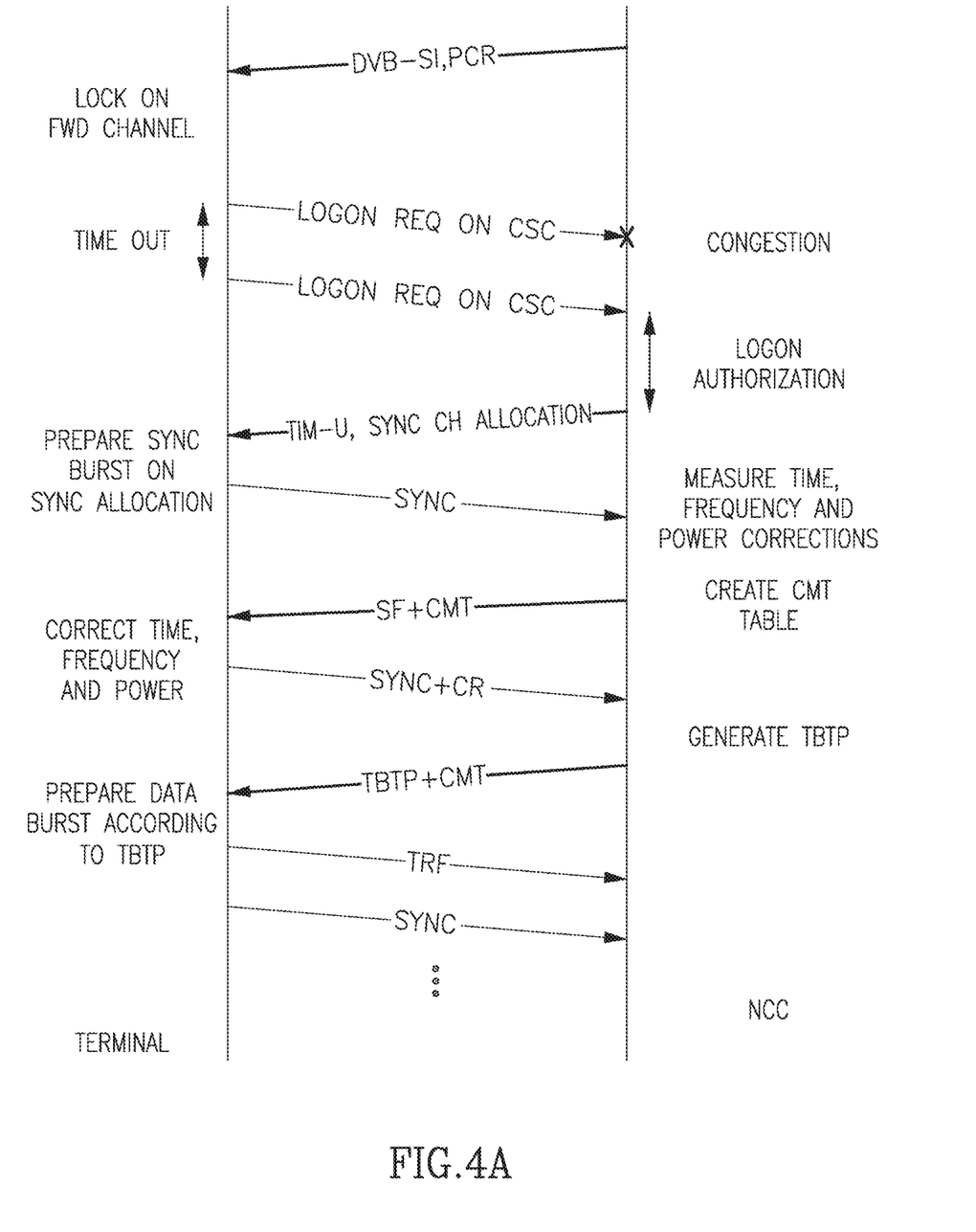
FIGS. 4A to 4D—demonstrate Logon procedures.

FIG. 4A demonstrates a logon procedure as implemented in prior art systems, describing the messages exchanged between the user terminal and the network centralized controller. The left extending arrows relate to messages conveyed along the forward channel (i.e. from the network controller to the user terminal), whereas the right extending arrows relate to messages conveyed along the return channel (i.e. from the user terminal to the network controller).

Figure 4B:
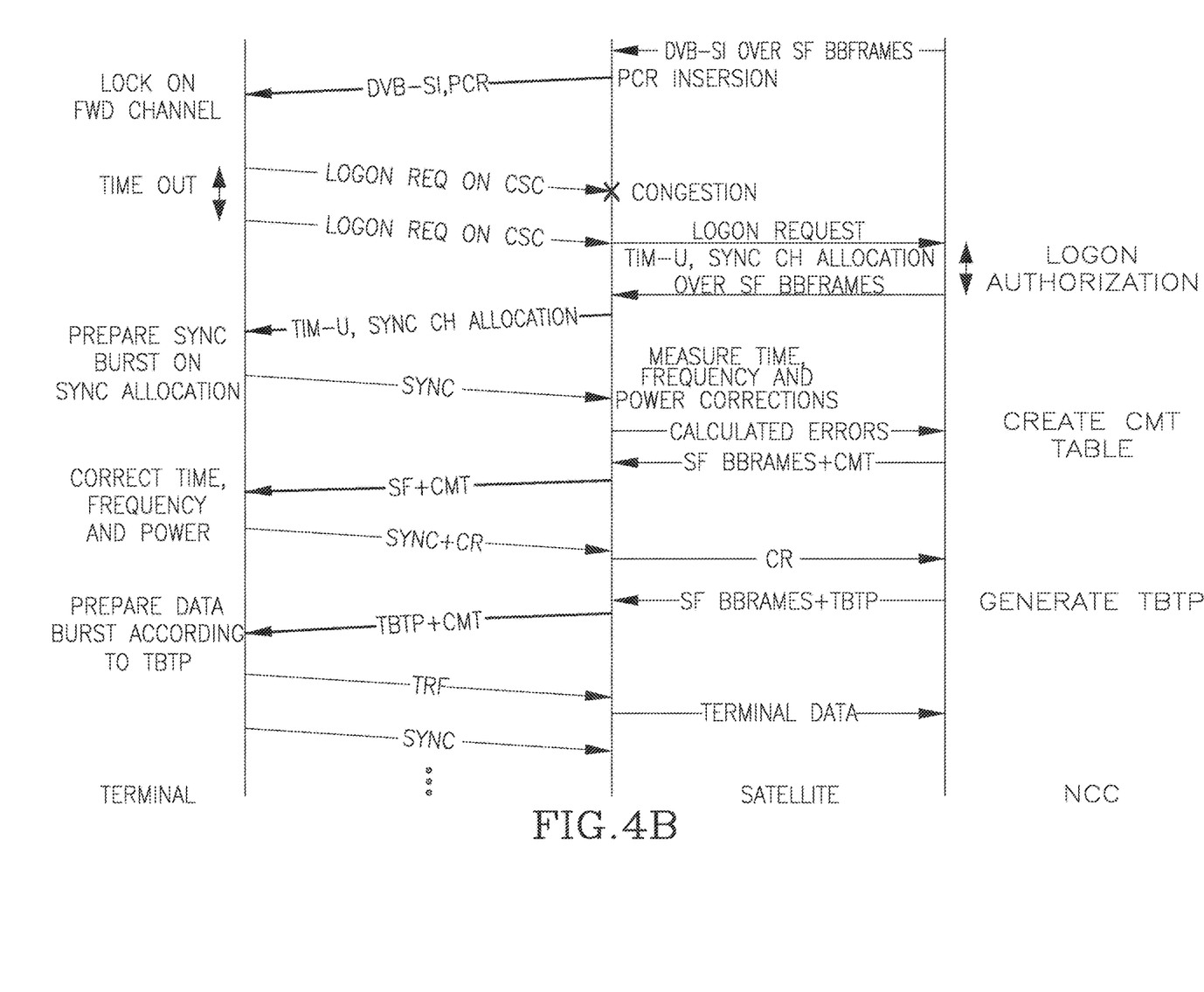

FIG. 4B demonstrates the steps taken for implementing a logon procedure that is carried out through inter-satellite links (ISLs). As part of implementing the procedure demonstrated in this example, the logon is implemented at the gateway (NCC) and the Network Clock reference (NCR) is generated at the satellite and inserted into the BBFRAME.

Figure 4C:
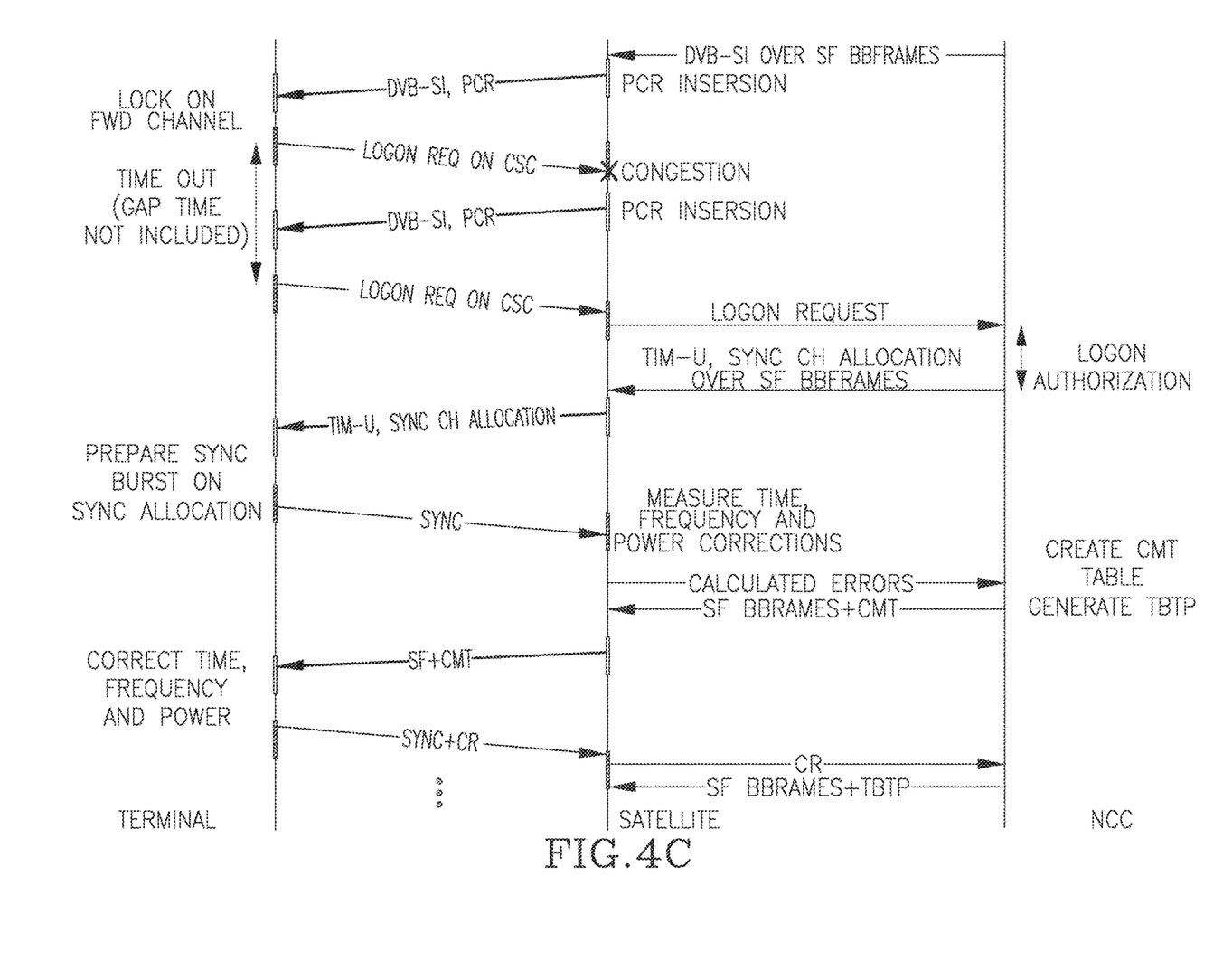

FIG. 4C demonstrates the steps taken for implementing another logon procedure that is carried out through inter-satellite links (ISLs) while implementing beam hopping. As part of implementing the procedure exemplified in this FIG. 4C, the transmission (TX) and reception (RX) are restricted to the hops. Also, the return channel hops are one super frame long and they follow the forward channel hop having a one or more hops delay there-between.

Figure 4D:
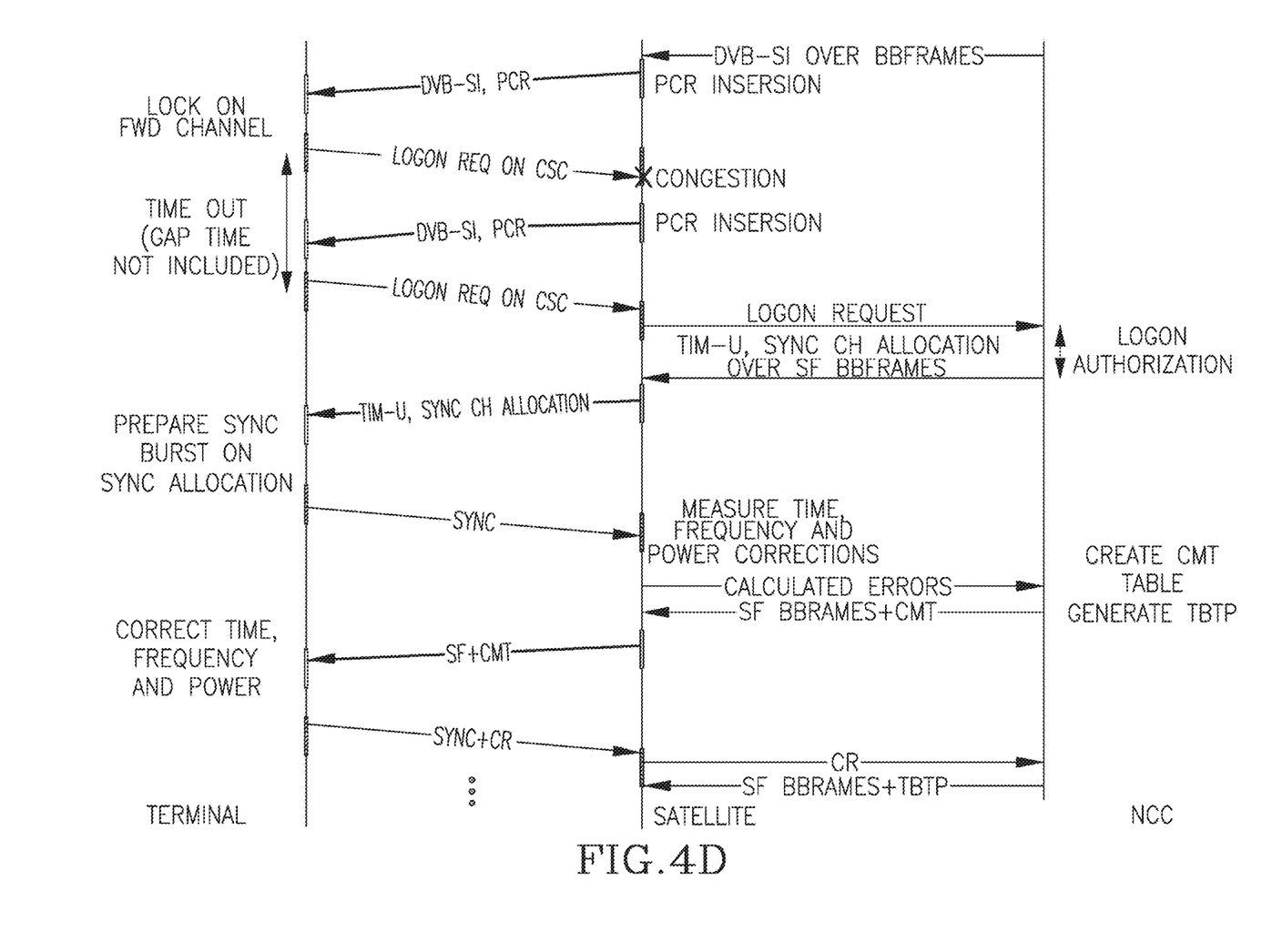

FIG. 4D demonstrates the steps taken for implementing yet another logon procedure that is carried out through inter-satellite links (ISLs) while implementing beam hopping.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features.

Variations of embodiments of the present invention that are described and embodiments of the present invention comprising different combinations of features noted in the described embodiments will occur to persons of the art. The scope of the invention is limited only by the following claims.

The invention claimed is:

1. A method for handling communications exchanged in a satellite communication network, wherein said communication network comprises at least one on-board switching satellite, each configured to provide direct connectivity between any pair of beams or inter-satellite links by performing packet switching, wherein the method is characterized in that a plurality of user terminals covered by a beam are configured to communicate with said at least one on-board switching satellite operative in said satellite communication network, while medium access control ("MAC") functionalities required for said plurality of user terminals to operate, are carried out partly by a switching satellite and partly by a ground communication device operative as a control gateway ("CoG"), and wherein said CoG is configured to communicate with said switching satellite along a control link established between said CoG and the switching satellite, together acting as a hub for the cell, and wherein a reduced number of MAC functionalities are carried out by said switching satellite, while the remaining MAC functionalities are carried out by said CoG.

2. The method of claim 1, further comprising a step of configuring a switching satellite operative in said satellite communication network to enable carrying out MAC functionalities associated with said plurality of user terminals by said CoG, wherein said plurality of user terminals are unaware that said MAC functionalities are carried out by said CoG rather than by the switching satellite.

3. The method of claim 1, further comprising a step of affecting separation between MAC functionalities performed by a switching satellite operative in said satellite communication network and MAC functionalities performed by the control gateway, in a way that the plurality of user terminals are unaware of said separation.

4. The method of claim 1, wherein a single CoG is used for communicating with all access networks served by a switching satellite at a given time.

5. The method of claim 1, further comprising a step of sending from the CoG to the switching satellite information for Adaptive Coding and Modulation ("ACM") of a forward channel and storing said information at an on-board memory means comprised within the switching satellite.

6. The method of claim 1, further comprising:
(i) separating control frames from data frames;
(ii) extracting Digital Video Broadcasting-Return Channel via Satellite2 ("DVB-RCS2") control fields from data frames' content;
(iii) processing data frames' content and forwarding them directly towards their respective destinations; and
(iv) forwarding control frames and data frames' control fields to the CoG.

7. The method of claim 1, further comprising a log-on procedure carried out through inter-satellite links (ISLs) while implementing beam hopping.

8. A method for handling communications exchanged in a satellite communication network, wherein the method is characterized in that a plurality of user terminals located within a single cell are configured to communicate with a switching satellite operative in said satellite communication network, while medium access control ("MAC") functionalities required for said plurality of user terminals to operate, are carried out by a communication device operative as a control gateway ("CoG") comprising the steps of:
a) receiving signal-to-noise measurement reports from each of the plurality of user terminals located within a cell, wherein said reports relate to signal-to-noise ratio associated with communications conveyed along a forward channel and received by a respective user terminal providing a signal-to-noise measurement report;
b) based on the signal-to-noise measurement report received from each of the plurality of user terminals, assigning a modulation/coding ("MODCOD") to each of the user terminals; and
c) transmitting to the switching satellite an updated terminal-address-MODCOD couplet.

9. The method of claim 8, wherein said switching satellite comprised in said satellite communication network comprises at least one processor operative to:
(i) populate, based on the MODCOD couplets received from the CoG, a MODCOD look-up table indexed by the address of the user terminal; and
(ii) upon receiving a forward-channel packet for transmission to a user terminal, apply a user-terminal address associated with said forward-channel packet, for retrieving a MODCOD comprised in said look-up table and applying said retrieved MODCOD for transmitting the forward-channel packet to the respective user terminal.

10. A control gateway ("CoG") adapted to be used in a satellite communication network, wherein said communication network comprises
at least one on-board switching satellite configured to provide direct connectivity between any pair of beams or inter-satellite links by performing packet switching,
wherein said CoG is configured to communicate with said at least one on-board switching satellite along a control link established between said CoG and the at least one on-board switching satellite, together acting as a hub for the cell, and
wherein said CoG is configured to execute medium access control ("MAC") functions required to enable operation of a plurality of user terminals located within a single cell, and
wherein a reduced number of MAC functionalities are carried out by said at least one on-board switching satellite, while the remaining MAC functionalities are carried out by said CoG.

11. The control gateway of claim 10, wherein the plurality of user terminals located within said single cell are associated with said CoG on a permanent basis.

12. The control gateway of claim 10, wherein said CoG is further configured to carry out non-real time operations.

13. The control gateway of claim 10, comprising a control plane which is separated from a data plane comprised thereat.

14. The control gateway of claim 13, wherein transmission (TX) and reception (RX) of communications are restricted to be carried out during beam hopping.

15. The control gateway of claim 10, configured to provide services to a plurality of cells, each with its own plurality of user terminals, and wherein all cells belonging to said plurality of cells, are simultaneously served by a switching satellite at a given time.

16. The control gateway of claim 10, further configured to send to a switching satellite connected thereto information that would allow said satellite to apply a respective Adaptive Coding and Modulation ("ACM") scheme to a forward channel.

17. The control gateway of claim 10, wherein said CoG comprises at least one processor operative to: a) receive signal-to-noise measurement reports from each of the plurality of the user terminals located within a cell controlled by the CoG, wherein said signal-to-noise measurement reports relate to signal-to-noise ratio associated with communications conveyed along a forward channel and received by a respective user terminal providing a signal-to-noise measurement report; b) based on the signal-to-noise measurement report received from each of the plurality of user terminals, assign a modulation/coding ("MODCOD") to each of the user terminals; and c) transmit to the satellite an updated terminal-address-MODCOD couplet.

* * * * *